US012248462B2

(12) United States Patent
Hasan et al.

(10) Patent No.: US 12,248,462 B2
(45) Date of Patent: Mar. 11, 2025

(54) SYSTEM AND METHOD FOR SEMANTIC SEARCH

(71) Applicant: Quantiphi Inc, Marlborough, MA (US)

(72) Inventors: Asif Hasan, Marlborough, MA (US); Kanishk Mehta, Mumbai (IN); Satyam Upadhyay, Mumbai (IN); Vivek Tripathi, Mumbai (IN); Raj Joshi, Mumbai (IN); Sarthak Phatate, Mumbai (IN); Bala Manikanta Thirunagaru, Mumbai (IN)

(*) Notice: Subject to any disclaimer, the term of this patent is extended or adjusted under 35 U.S.C. 154(b) by 3 days.

(21) Appl. No.: 18/064,283

(22) Filed: Dec. 11, 2022

(65) Prior Publication Data
US 2024/0193157 A1 Jun. 13, 2024

(51) Int. Cl.
G06F 16/00 (2019.01)
G06F 16/22 (2019.01)
G06F 16/242 (2019.01)
G06F 16/248 (2019.01)

(52) U.S. Cl.
CPC ........ G06F 16/243 (2019.01); G06F 16/2228 (2019.01); G06F 16/248 (2019.01)

(58) Field of Classification Search
CPC ... G06F 16/243; G06F 16/2228; G06F 16/248
See application file for complete search history.

(56) References Cited

U.S. PATENT DOCUMENTS

| | | | |
|---|---|---|---|
| 7,350,138 B1 * | 3/2008 | Swaminathan | G06Q 10/10 707/999.01 |
| 2008/0086508 A1 * | 4/2008 | Ballew | G06Q 10/10 |
| 2014/0258285 A1 * | 9/2014 | Lavine | G06F 16/29 707/728 |
| 2016/0034565 A1 | 2/2016 | Bastide et al. | |
| 2022/0179896 A1 * | 6/2022 | Farrell | G06F 40/131 |
| 2022/0222277 A1 * | 7/2022 | Pasumarthy | G06F 16/951 |

OTHER PUBLICATIONS

Gliozzo, et al., "Building Cognitive Applications with IBM Watson Services: vol. 1 Getting Started", International Technical Support Organization, IBM Skills Academy Program, Jun. 2017, 130 pages.

* cited by examiner

Primary Examiner — Thu Nguyet T Le
(74) Attorney, Agent, or Firm — RC Trademark Company

(57) ABSTRACT

Disclosed is a system and a method for semantic search in an enterprise. The method comprises defining entities in the enterprise, indexing content from one or more data sources of the enterprise to determine relationships between individual pieces of the content and one or more of the entities, providing an interface to allow a user to enter a search query, parsing the search query, determining relevant pieces of the content based on the parsed search query, identifying the one or more of the entities for each of the relevant pieces of content based on the relationships therebetween and configuring the interface to display each of the relevant pieces of the content under respective one or more of the entities in response to the search query.

10 Claims, 11 Drawing Sheets

SYSTEM AND METHOD FOR SEMANTIC SEARCH

TECHNICAL FIELD

The present disclosure relates to search engines. Specifically, the present disclosure relates to systems and methods for semantic search in an enterprise.

BACKGROUND

With the recent advancements in Natural Language Processing (NLP) and Artificial Intelligence (AI), search engines and/or platforms have experienced significant developments. Existing searching technologies are related to semantics-based search engines i.e., searching technologies including query answering engines based on semantic searching across various datasets for providing relevant search results. Such techniques employ conventional artificial intelligence (AI) capabilities such as, natural language processing (NLP) and machine learning (ML), to provide the relevant search results.

Enterprise search refers to the practice of making content from multiple data sources, such as databases and intranets, searchable to a defined audience. Enterprise search engines and enterprise resource planning (ERP) tools exist today, that allow the user to enter a query and attain results such as, via keyword matching between potential results and the search query. However, such technologies are generic in nature i.e., do not allow customizations and/or modifications based on different types of data source for providing the search query. Additionally, such technologies do not account for interrelationships between two or more entities and are largely based on pure searching techniques and thus, unable to provide relevant and/or accurate information required by the user.

Therefore, in light of the foregoing discussion, there exists a need to overcome the aforementioned drawbacks associated with the existing enterprise search engines and provide and improved method for semantic search in an enterprise.

SUMMARY

The present disclosure seeks to provide a computer implemented method for semantic search in an enterprise. The present disclosure also seeks to provide a system for semantic search in an enterprise. An aim of the present disclosure is to provide a solution that overcomes at least partially the problems encountered in prior art.

In one aspect, an embodiment of the present disclosure provides a computer implemented method for semantic search in an enterprise, the method comprising:
  defining entities in the enterprise;
  indexing content from one or more data sources of the enterprise to determine relationships between individual pieces of the content and one or more of the entities;
  providing an interface to allow a user to enter a search query;
  parsing the search query;
  determining relevant pieces of the content based on the parsed search query;
  identifying the one or more of the entities for each of the relevant pieces of content based on the relationships therebetween; and
  configuring the interface to display each of the relevant pieces of the content under respective one or more of the entities in response to the search query.

In another aspect, an embodiment of the present disclosure provides a system for semantic search in an enterprise, the system comprising:
  one or more data sources;
  at least one server communicably coupled to the one or more data sources,
  wherein the at least one server is configured to:
    define entities in the enterprise;
    index content from the one or more data sources of the enterprise to determine relationships between individual pieces of the content and one or more of the entities;
    provide an interface to allow a user to enter a search query;
    parse the search query;
    determine relevant pieces of the content based on the parsed search query;
    identify the one or more of the entities for each of the relevant pieces of content based on the relationships therebetween; and
    configure the interface to display each of the relevant pieces of the content under respective one or more of the entities in response to the search query.

Embodiments of the present disclosure substantially eliminate or at least partially address the aforementioned problems in the prior art, and enables semantic searching in an enterprise in an accurate and efficient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
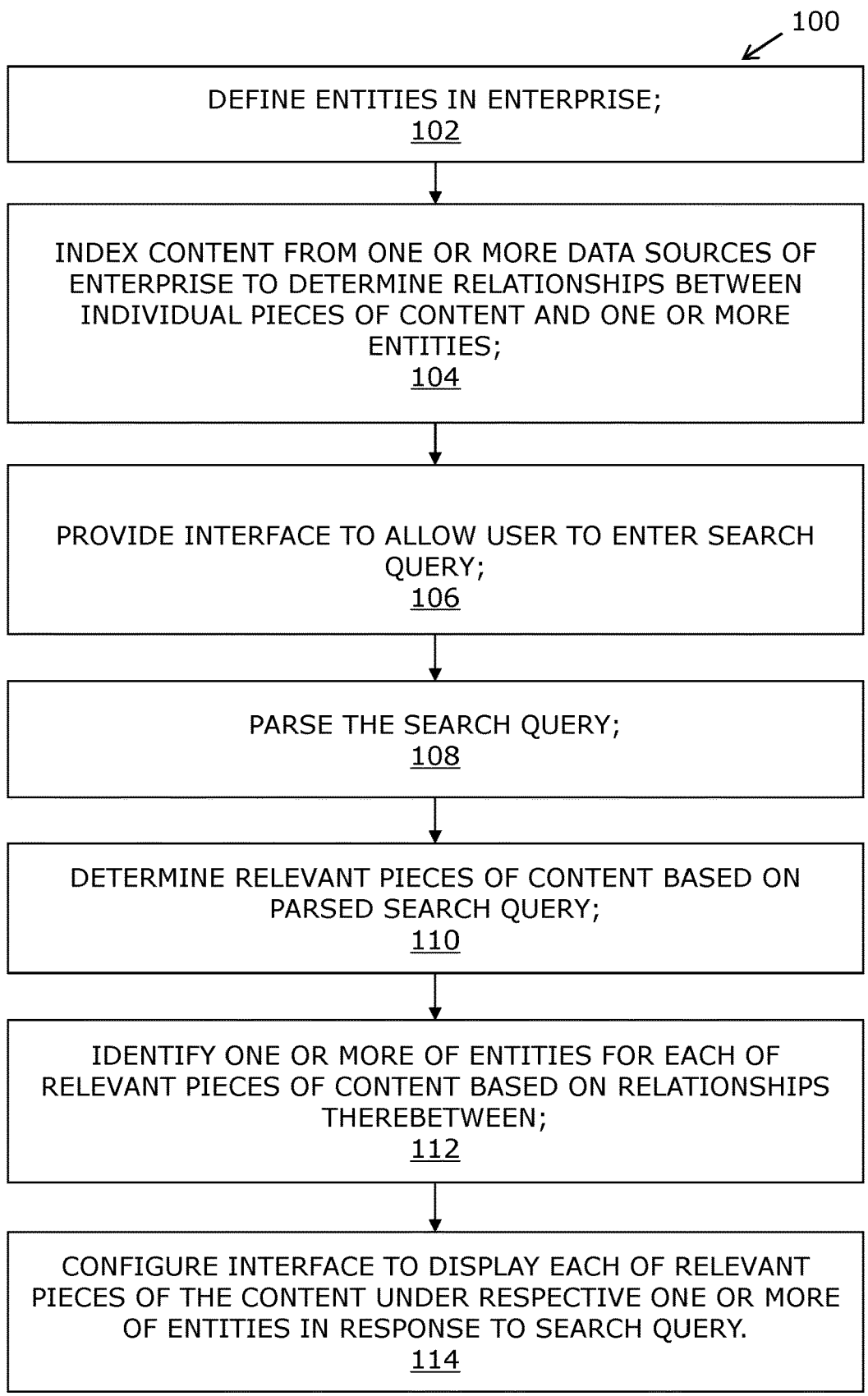
FIG. 1 illustrates a flowchart listing steps involved in a computer-implemented method 100 for semantic search in an enterprise, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a computer implemented method for semantic search in an enterprise, the method comprising:
  defining entities in the enterprise;
  indexing content from one or more data sources of the enterprise to determine relationships between individual pieces of the content and one or more of the entities;
  providing an interface to allow a user to enter a search query;
  parsing the search query;
  determining relevant pieces of the content based on the parsed search query;
  identifying the one or more of the entities for each of the relevant pieces of content based on the relationships therebetween; and
  configuring the interface to display each of the relevant pieces of the content under respective one or more of the entities in response to the search query.

In another aspect, an embodiment of the present disclosure provides a system for semantic search in an enterprise, the system comprising:
  one or more data sources;
  at least one server communicably coupled to the one or more data sources,
  wherein the at least one server is configured to:
    define entities in the enterprise;
    index content from the one or more data sources of the enterprise to determine relationships between individual pieces of the content and one or more of the entities;
    provide an interface to allow a user to enter a search query;
    parse the search query;
    determine relevant pieces of the content based on the parsed search query;
    identify the one or more of the entities for each of the relevant pieces of content based on the relationships therebetween; and
    configure the interface to display each of the relevant pieces of the content under respective one or more of the entities in response to the search query.

The present disclosure provides a computer implemented method for semantic search in an enterprise. The term "enterprise" refers to any company, business or organization for which semantic searching is implemented via the method. Generally, the method is related to an enterprise searching method configured for making content from multiple data sources, such as, different databases and/or networks, searchable to a defined audience. Herein, the method of enterprise search involves the creation of a first-class search application tailored to various data sources with a custom-developed UI, designed as a highly personalized search experience that delivers answers within the context of the enterprise.

Typically, the method is an enterprise search engine-built ground up for fast and scalable NLP-powered search across software systems, repositories and databases associated with, or in, the enterprise. The method is configured to serve as an all-in-one enterprise solution to provide various types of information based on a single search query being executed. Alternatively stated, the method is an all-in-one search platform that enables the user to find efforts and projects in the past that were undertaken, repositories containing code logic that is reusable, and also the top individuals that possess the best proficiency related to a particular skill all through search query(ies). Further, the method also allows the user to upload a set of skills based on the skill repositories available and also contains a resume parser allowing skills to be extracted from the resume of any individual. Additionally, the method comprises a mechanism configured to allow a user to rate themselves along with his peers. Apart from people data, the method is also connected with multiple data sources for retrieving information therefrom.

Existing searching technologies are related to semantics-based search engines i.e., enterprise searching technologies including query answering engines based on semantic searching across various datasets for providing relevant search results. Such techniques employ conventional artificial intelligence (AI) capabilities such as, natural language processing (NLP) and machine learning (ML), to provide the relevant search results. These technologies are capable of performing the enterprise searching through various means such as, attaining search results through keyword matching between potential results and the search query. However, such technologies are generic in nature i.e., do not allow customizations and/or modifications based on different types of data source for providing the search query. Additionally, such technologies do not account for interrelationships between two or more entities and are largely based on pure searching techniques and are therefore unable to provide accurate search results based on the context.

Considering an example for the search of project information on the search engine, wherein a user inputs a query "Computer vision in sports". Existing enterprise search engines would try to match the keyword in the query with various projects containing the same. However, such semantic searching techniques would be unable to understand the context behind the query and bring out the computer vision projects particularly related to sports, wherein projects/results appear containing highlighted information as to why the result is related to the search query. In light of the aforementioned problems, the present disclosure is configured to provide a computer implemented method for providing accurate search results in an efficient manner based on the context of the enterprise.

The method comprises defining entities in the enterprise. The term "defining" as used herein refers to allocation of identity to each of the entities in the enterprise based on at least one of characteristics or attributes of the entities. The term "entities" as used herein refers to different types of objects, for example, projects, repositories, or people, associated with the enterprise. The entities form vital parts of the enterprise and definition thereof. The present method enables accurate location and/or searching of required information i.e., information retrieval based on the defined entities in a faster and accurate manner.

In one or more embodiments, the entities comprise one or more of project entity, people entity and repositories entity in the enterprise. The term "project entity" as used herein refers to a type of entity associated with a certain project or work of the enterprise. For example, the project entity may be a consulting project, a research project, an analysis project, a data project, a project associated with a company, a project associated with a product, a project associated with a government, and the like. It will be appreciated that the project entity may be defined as any project or work undertaken by the enterprise. The project entity comprises information associated with the project such as, type of project, progress of project, personnel associated with the project entity, field of project, expert personnel associated with the field of project, time taken, work output, benefits, and the like which may be required to be searched via the method. Beneficially, the defined project entity enables retrieval of all information associated with the project entity such as, personnel involved, project data, project progress, etc., in an effective and comprehensive manner and also allows a user, to manage multiple projects and associated personnel efficiently. The term "people entity" as used herein refers to a type of entity associated with a certain personnel associated with the enterprise. For example, the people entity may be an employee of the enterprise, or owner of the enterprise, or a consultant associated with the enterprise, an auditor, and the like. It will be appreciated that the people entity may be defined as any personnel undertaking or performing any work or project from, or for, the enterprise. The people entity may be associated with one or more project entity i.e., one person may undertake multiple projects which will be made searchable via the associated people entity. Typically, the people entity comprises information associated with the person such as, resume information, experience information, projects undertaken, level and area of expertise, and the like. Beneficially, the defined people entity enables retrieval of all information associated with a personnel such as, projects executed, area and level of expertise, resume information, other personal information. The term "repositories entity" as used herein refers to a type of repository or database associated with the enterprise. For example, the repositories entity may be a type of database such as, but not limited to, a table or an attribute, a cloud database, a distributed ledger, etc., or a type of database management system such as, SQL®, Ruby®, and the like. It will be appreciated that the repositories entity may be defined as any database or repository, or database management system, utilized by the enterprise. Beneficially, such definition of the entities into the repositories entity, the people entity and project entity, enables provision of comprehensive and accurate search results via the present method (as discussed hereinafter in more detail).

The present method further comprises indexing content from one or more data sources of the enterprise to determine relationships between individual pieces of the content and one or more of the entities. Herein, the method is configured to index the content from the one or more data sources of the enterprise to determine relationships between the individual pieces of the content and one or more of the defined entities to enable the method to link the individual pieces of the content with at least one of the defined entities for enabling collective provision of all associated information during searching. For example, the present method provides indexing the content from the one or more data sources into a pre-defined database. The indexing of the content from the one or more data sources may comprise at least one of parsing, tokenization, analysis, and arrangement operations applied on the content for enabling accurate and efficient indexing via the method. Typically, the indexing of the content is required to reduce the computational power usage and time for each result by preventing unnecessary processing of data i.e., irrelevant data is selectively excluded, or not processed, based on the implementation. Beneficially, indexing the content and the individual pieces thereof optimizes the speed and performance of the method and thereby, enables accurate and/or relevant results to be provided in an efficient manner.

In one or more embodiments, indexing the content from the one or more data sources comprises parsing the content from the one or more data sources to extract text from the individual pieces of the content. Alternatively stated, the indexing operation comprises parsing the content, i.e., both structured and un-structured data, for example, flat files like PDF, docx, pptx, etc. are processed, for enabling text extraction thereof.

Optionally, parsing the content from the one or more data sources further comprises linking the content to the defined entity. Herein, the content is linked or associated with the defined entity associated therewith, for example, resume data is linked against a person's profile. Similarly, relationships between the content (i.e., documents or data) and the defined entities i.e., the people entity, the project entity, and the repositories entity are maintained and made searchable via the present method.

In one or more embodiments, indexing the content from the one or more data sources further comprises grouping the extracted text into one or more groups. That is, upon extracting the text from the content, the present method further comprises grouping the extracted text into the one or more groups, wherein the grouping is based on at least one of semantics, context, frequency, and relevance of the extracted text. In an example, similar words or synonyms may be grouped in a first group. In another example, maximum occurring words may be grouped in a second group.

Optionally, grouping the extracted text into one or more groups comprises tokenizing the extracted text using token indices defined in a token library to generate a plurality of tokenized tensors. The term "tokenizing" as used herein refers to the process of breaking up a string into one or more tokens, wherein the tokens may be words, numbers, and/or punctuations. Herein, the extracted text is converted into the plurality of tokenized tensors (or tokens) for further processing. The tokenization of the extracted text may be performed using tokenization techniques based on hyperparameters such as, frequency, length, size, whitespace, context, sub-words, and the like. The tokenization techniques may include at least one of whitespace tokenization (i.e., whitespaces in the extracted text), code tokenization (i.e., pre-defined codes or boundaries), sub-text tokenization, sub-tokenization, sentence tokenization, and BERT tokenization. Additionally, the tokenization process enables generation of a word index configured for mapping the extract words, based on a vocabulary, to a numeric representation, wherein the mapping may be essential for encoding the extracted text.

Optionally, grouping the extracted text into one or more groups further comprises processing each of the one or more tokenized tensors to generate a plurality of finalized tensors and splitting the plurality of finalized tensors into the one or more groups, wherein each group comprises up to 512 tokenized tensors. That is, upon tokenizing the extracted text into the one or more tokenized tensors, additional processing steps are required to make the tokenized tensors viable for grouping via the present method. The additional processing steps i.e., the processing of each of the one or more tokenized tensors via the present method comprises at least one of at least one of padding tokenized tensor, replacing tokenized tensor, adding at least one special tokenized tensor, wherein the special tokenized tensor is at least one of sequence tensor and separator tensor, masking tokenized tensor, truncating the one or more tokenized tensors and padding the plurality of tokenized tensors. Further, the generated plurality of finalized tensors are split into the one or more groups based on processing requirements of the implementation i.e., each group of the one or more groups may contain different or similar number of finalized tensors as per requirement. For example, the number of finalized tensors in each group of the one or more groups may be in a range of 2, 8, 16, 64, 128, 256 to 8, 16, 64, 128, 256, 512, without any limitations.

In one or more embodiments, indexing the content from the one or more data sources further comprises generating embeddings for each of the one or more groups. That is, upon grouping the extracted text into the one or more groups, the present method further comprises generating the embedding for each of the one or more groups containing the plurality of finalized tensors. In an exemplary scenario, 1020 finalized tensors are split into two token groups of 510 tensors, wherein embedding for each of the two groups are generated via the present method for indexing the content. Optionally, two special tensors i.e., a sequence tensor and a separator tensor, are added to each of the two token groups, to form the one or more groups comprising 512 tokens each. The term "embedding" as used herein refers a low-dimensional space configured for translating vectors of continuous numbers, for example, word embeddings or sentence embeddings. The generating embeddings allow processing of large inputs, for example, sparse vectors representing multiple words, wherein the embeddings capture semantics of the input by placing semantically similar content, or pieces thereof, close together in the embedding space. The generation of the embeddings may involve conversion of the plurality of finalized tensors into vectors of real numbers based on a set of language and feature learning techniques applied for natural language processing via the method. The embeddings for each of the one or more groups may be generated by at least one of a transformer, or autoencoder, or a predictor, configured for mapping the plurality of finalized tensors, in the one or more groups against a predefined vocabulary and/or ontology database, into the vectors of real numbers. Herein, similar words in a semantic sense have a smaller distance (for example, cosine, Euclidean, cosine or any other measure) between them than words that have no semantic relationship i.e., have a smaller vector.

In one or more embodiments, the embeddings are generated by implementing Sentence Bidirectional Encoder Representations from Transformers (SBERT). Since, processing huge amounts of data would require huge amounts of computational power and time using conventional BERT, for example, searching for the most similar pair in a collection of 10,000 sentences requires approximately 50 million inference computations with BERT requiring multiple days of time and thus, to overcome the aforementioned problem, the present method involves implementation of SBERT for generating semantically meaningful sentence embeddings that can be compared using the similarity measure, for example, cosine-similarity. Herein, the present method implements SBERT that utilizes a twin network capable of processing different sentences simultaneously and improving the computational efficiency of the method. Furthermore, the present method is configured to adjust or minimize the losses associated with the search operation. However, it will be appreciated that the present method may employ ant other embedding or encoding technique without limiting the scope of the present disclosure.

In one or more embodiments, indexing the content from the one or more data sources further comprises implementing the generated embeddings for indexing of the content. That is, herein, the generated embeddings are implemented via the present method for indexing the content based on at least one of rank, similarity, relevance, semantics, and thereby inserted into an index database for providing querying and searching functions to the method.

Optionally, the indexed content is stored in an index database, wherein the indexing operation via the present method is implemented based on index design factors i.e., factors affecting the indexing operation and storage of the indexed data. The term "index database" refers to a database configured for storing the indexed data and may further comprises an indexing DBMS for analysing and/or processing the indexed content. For example, the index database is at least of a suffix tree, an ontology graph, an inverted index, a citation index, a n-gram index, a document-term index, and a semantic index. The index database is designed based on the index design factors to allow for faster and secure processing of the indexed content via the present method, wherein the index design factors include, but are not limited to, merging factors, storage techniques, index size, processing speed, fault tolerance, maintenance.

The term "data source" as used herein refers to a source of data configured for providing and/or transmitting content. The data source may be a database or repository, a memory, or data from a computer, a server, or any other electronic device capable of transmitting data. The present method may be implemented (integrated) with different data sources across the enterprise and thereby, provides a single interface or one stop search platform across the one or more data sources. The one or more data sources include at least the people entity, the project entity and the repositories entity. For example, the one or more data sources include, people data (for example, human resources information system (HRIS), certifications data, resume data or personal data), data repositories (such as, Google Drive®, Git repositories, etc.), internal or external enterprise projects (for example, technical documents, reports, etc.), externally stored enterprise data, reusable utilities and/or accelerators (for example, Notebooks, ML models, programming codes or modules). Other data sources may also include content management systems (CMS's), enterprise resource planning solutions, customer relationship management (CRM) solutions, relational database management systems (RDBMS's), file systems, archives, data stores, email systems, websites, intranets and social networks.

The term "relationships" refers to connections or links between one or more of the defined entities and the individual pieces of the content. In an example, each people entity may be associated with multiple project entities and repositories entity and thus, to inculcate the entire required information at a single instance, the relationships between the people entity and the multiple project entities and the repository entities are determined. Herein, the relationships between any entity (such as, people entity) with any other entity (such as, project entity) or any individual piece of content such as, information associated with the people entity, is determined to enable information retrieval of all associated and/or relevant information. Alternatively stated, the determined relationships enable provision of an interlinked search via the method i.e., any search performed based on the determined relationships between various data sources associated therewith, in order to provide interconnect search results (as a response). Beneficially, the present method is capable of providing search results in an interconnected format which in turn increases the efficacy and computational efficiency of the method due to the increased resource availability, for example, for identifying the right person or resource having expertise in a targeted skill, and efficient identification of the required information based on related implementations or projects. Further, similar implementations or use cases can be identified using the semantic search operation via the method that searches across various assets (or entities). Moreover, related code utilities and accelerators i.e., any reusable coded programs, utilities, or accelerators, associated with search term or query, are capable of providing a list of interlinked artifacts that meet the implementational requirements.

Notably, the relationships between individual pieces of the content and one or more of the entities may be determined either manually, for example, a set of enterprises (or SME's) enabling mapping between tools or technologies by categorizing the relations as well, or automatically, for example, via advanced machine learning, wherein the present method may be trained to cluster the tools or technologies together. Optionally, the present method may be configured with one or more machine learning models trained for performing the indexing operation based on the defined entities to determine the relationships, wherein the determined relationships may be mapped onto an ontology graph for providing a visual depiction of the determined relationships via the interface. For example, an ontology graph may be generated via the machine learning model allowing for improving the existing accuracy and correspondingly, providing more relevant search results via the present method for semantic search in the enterprise.

Optionally, the determined relationships between one or more of the defined entities and the individual pieces of the content may be characterized as a static relation. The term "static relation" as used herein refers to direct relationships derived from structured or unstructured metadata points that does not change over time, wherein the static relations may be determined based on key attributes of the associated one or more of the defined entities. Herein, key attributes of the defined entities are utilized via the present method for determining the static relationships between one or more of the defined entities. In an exemplary scenario, a project entity may be identified by a first key attribute (or distinctive feature) i.e., project ID, and since the project entity may be associated with one or more people entities and/or repository entities, the static relations therebetween are determined via the project ID of the project entity. Further, the one or more people entities, associated with the project entity via the project ID, may further comprise static relations associated with individual pieces of the content, wherein the static relations may comprise at least one of skill, certification, location, designation, project(s) undertaken, repositories utilized, and the like, associated with each people entity.

Optionally, the determined relationships between one or more of the defined entities and the individual pieces of the content may be characterized as a dynamic relation. The term "dynamic relation" refers to inferred connections or relationships determined (or calculated) on the go i.e., dynamically, via the present method. The dynamic relations may be based on a predefined factor including at least one of frequency, rank, ontology, context. In an example, if any user searches for a resource or a person entity, then the result set for associated project entity and data repository will be generated based on the ranking of the associated resource or person entity. In another example, if any user searches for a project entity, then the result set will display the associated people entity as top ranks under people entity tab and similarly, the associated data repositories are top ranked and displayed under data repositories tab. In another example, if any user searches for a particular data repositories entity, then the result set under people entity tab will display either the associated members or contributors to the data repositories as top ranks under the people entity tab, and under the project entity tab, the project(s) associated with the particular data repositories will be ranked highest.

Optionally, determining the dynamic relationships between one or more of the defined entities and the individual pieces of the content further comprises ranking the defined entities, based on at least a similarity metric or relevance level of the entity and the individual pieces of the content, to provide ranked entities. The term "similarity metric" as used herein refers to a real-valued function configured for quantifying similarity between two objects. Herein, the similarity metric may be at least one of an inverse distance metric i.e., positive values for similar objects and either zero or a negative value for very dissimilar objects, a cosine similarity metric, semantic metric, Euclidean distance, Manhattan distance, Jaccard Similarity, and Minkowski Distance. The dynamic relationships between one or more of the defined entities and the individual pieces of content or another one the defined entities may comprise a Boolean logic for ranking the defined entities and thereby determining the dynamic relations between one or more the defined entities and the individual pieces of content. Typically, the defined entities are ranked based on the similarity i.e., with the search query and wherein each of the defined entities may be separately ranked using a similar or different Boolean logic. In an exemplary scenario for ranking people entities, the people who have worked on a project entity are deemed most relevant as per cosine similarity of search term and textual metadata in the project entity, and people having skillsets similar to the search term are ranked higher. Thus, providing the most relevant people entity, or any other relevant defined entity, based on the requirements of the implementation. In another exemplary scenario for ranking of data repositories, a similar Boolean logic is applied, wherein the search results are ranked via a similarity metric based on top results (or highest ranks) for searching associated people or project entities, wherein the projects are linked to the data repositories entity (such as, a Code Repository) and the person entities as contributors to the repositories entity. Hence, the ranking of the defined one or more entities comprises using these relationships and the similarity metric such as, the cosine similarity, between the textual metadata and search term, for the search results to be ranked accordingly.

Additionally, or alternatively, determining the dynamic relationships between one or more of the defined entities and the individual pieces of the content further comprises boosting one or more of the ranked entities based on at least one of the similarity metric and a semantic metric. The term "semantic metric" refers to a quantitative measure of the semantic relationships determined between one or more of the defined entities and the individual pieces of content. The term "boosting" as used herein refers to the process of increasing ranks of the defined and/or indexed entities based on the sematic metric or similarity metric. Beneficially, boosting of the one or more ranked entities improves the relevancy and accuracy of the search results provided via the method.

Optionally, the boosting or amplification of the one or more of the ranked entities comprises at least one of query time boosting, rule-based boosting, and index time boosting. In query time boosting, the method is configured to process any search query for determining the content and/or context therein for boosting contextually relevant results based on the determined context. Such an implementation utilizes the query i.e., the search query, to determine relevant search results for improving the accuracy of the present method. For example, the boosting of a defined entity is done by processing the search query based on at least one of location, visit frequency, historical data, and so forth. Upon indexing the defined entities, the indexed entities may be boosted via the present method i.e., via index time boosting, wherein at least one of the indexed entities may be boosted based on a relevance or similarity metric. For example, the people entity with the most experience in a desired field is boosted. In rule-based boosting, the present method may further define boosting rules that when satisfied by any of the indexed entities is boosted, or ranked higher. It will be appreciated that other types of boosting techniques or a combination thereof may be utilized by the present method without departing from the spirit and the scope of the present disclosure.

The present method further comprises providing an interface to allow a user to enter a search query. Typically, any user associated with the enterprise, subject to authorization, may be allowed to enter the search query for performing the semantic search in the enterprises. The term "interface" as used herein refers to a point of interaction and/or communication with a user such as, for enabling access to the user and receiving the search query therefrom, wherein the user may be any personnel, or owner, or any other person such as, a consultant, or auditor, associated with the enterprise. The interface may be configured to receive the search either directly from a device, or in-directly via another device, webpage, or an application configured to enable the user to provide the search query. The term "search query" refers to a string of terms or characters entered or provided, via the interface, by the user for retrieving relevant search results therefrom. i.e., relevant defined entities and associated individual pieces of content Herein, the interface may be configured with multiple input modules, wherein one or more of the input modules may be configured to receive the entered search query for further processing thereof. The term "input module" as used herein refers to interactive elements or input controls of the user interface configured to allow the user to provide user input, for example, the search query, to the present method for semantic search in the enterprise. In an example, the input module includes, but is not limited to, a text field, a checkbox, a list, a list box, a button, a radio button, a toggle, and the like. Additionally, the interface may be configured with different input modules based on the type of search implementation for improving the user experience and efficiently retrieving the desired information.

Optionally, the interface may be configured to provide at least one of a project entity search module, a people entity search module, a repositories entity search module, or a combination search module. Herein, the project entity search module is configured to provide relevant results of project entities containing information including, but not limited to, project name, customer name, project description, associated project members, and the like. Further, the people entity search module comprises an index database, such as, an employee database of the enterprise, accessible via the search query, for example, when a name of the employee is entered as the search query, and skills of the people entity based on the linked repositories are displayed via the interface. Similarly, during searching of a particular skill, the corresponding people entity having proficiency in the skill is displayed along with the measurement of the level of proficiency related to the particular skill being queried via the search query. Furthermore, the repositories entity search module is configured to display or provide user-accessible information i.e., files and/or documents stored in any external storage that are related to the search query. Herein, optionally, the present method, via the interface, may be configured to display and provide access to user-accessible data repositories related to the search query.

Additionally, the interface further comprises one or more searching modules for allowing the search effectively via the present method. The one or more searching modules comprises at least one of a default search module, a keyword search module, a relevance search module, a quick search module, and a deep search module. Herein, the default search module is configured to perform a keyword search along with quick semantic search to quickly provide the relevant search results to the user, or alternatively perform a deep search if unsatisfied with the results. The keyword search module allows to detect and thereby produce relevant search results based on at least a match of the keyword entered as the search query by the user. The relevance search module allows to analyse and understand the context of the search query and thereby provide relevant search results to the user. Herein, the ranking of the relevant search results may be based on, in order, project description, scope of work, technical design document, and business requirement document. The quick search module provides the search results based on a semantic understanding based on the generated embeddings, wherein the first 500 or 510 tokens from the following documents may be taken into consideration while performing the searching operation. Notably, the 500 or 510 tokens are initially processed to obtain faster search results to improve the efficiency of the method. The deep search module provides the search results based on a semantic understanding of all the indexed content and the defined entities, wherein all the extracted text from the parsed content is processed i.e., taken into consideration to provide accurate search results and thereby improving the efficacy and/or accuracy of the present method.

The present method further comprises parsing the search query and determining relevant pieces of the content based on the parsed search query. That is, upon indexing the content from the one or more data sources of the enterprise, the search query is parsed for analysis thereof, wherein the parsed search query may be utilized to obtain a context of the search query, for obtaining relevant search results via the present method. Further, upon parsing the search query, the present method further comprises determining relevant pieces of the content based on the parsed search query i.e., based on the determined relationships between one or more of the defined entities and the individual pieces of the content, the present method is configured to determine the relevant pieces of the content based on the parsed search query i.e., utilized to determine the context, to obtain relevant pieces of the content, to be provided as part of the search results.

In one or more embodiments, the present method further comprises sorting the relevant pieces of the content independently under each of respective one or more of the entities based on relevance of the corresponding relevant pieces of the content for the parsed search query and the one or more of the entities. That is, upon determining the relevant pieces of the content, the present method is further configured to sort the relevant pieces of the content independently under each of respective one or more of the entities such that the efficiency of the method may be increased due to reduced time taken during the searching operation.

In one or more embodiments, the relevant pieces of the content comprise relevant past projects related to the parsed search query, and wherein the interface is configured to display the relevant past projects under the project entity in response to the search query. Alternatively stated, the relevant pieces of the content that are fetched via the present method comprises relevant past projects i.e., projects that are relevant based on the parsed search query. Further, the interface is configured to display the relevant past projects under the project entity (tab) in response to the search query. Typically, the determined relationships between one or more of the defined entities and the individual pieces of the content is utilized by the present method for determining the relevant pieces of content from the individual pieces of content that are to be displayed as search results under the project entity tab based on the parsed search query.

In one or more embodiments, the relevant pieces of the content comprise relevant profiles of people with skills related to the parsed search query, and wherein the interface is configured to display the relevant profiles of people under the people entity in response to the search query. Herein, the "relevant profiles" refer to one or more of the total individual profiles maintained via the present method, for example, associated with each person entity, wherein the relevant profiles are determined based on the parsed search query.

In one or more embodiments, the relevant pieces of the content comprise at least one of relevant code repositories and relevant data repositories related to the parsed search query, and wherein the interface is configured to display the at least one of relevant code repositories and relevant data repositories under the repositories entity in response to the search query. Similar to the people entity, the relevant code repositories and the relevant data repositories are selected based on the parsed search query i.e., the relevant repositories based on the parsed search query is made accessible to the user, provided as search results via the method.

The present method further comprises configuring the interface to display each of the relevant pieces of the content under respective one or more of the entities in response to the search query. That is, upon determining the relevant pieces of content from the individual pieces of the content, the present method further comprises configuring the interface to display each of the relevant pieces of the content under respective one or more of the entities as a response to the search query i.e., based on the determined relationships each of the entities is displayed along with the associated relevant pieces of content under a defined output module, for example, a tab or space within the interface, for at least each type of the defined entities i.e., a people entity tab for displaying people entities and related content, a project entity tab for displaying project entities, and a repositories entity tab for displaying relevant repositories or databases.

In one or more embodiments, the present method further comprises determining access level of the user in the enterprise and configuring the interface to display the identified relevant pieces of the content based on the determined access level of the user. Typically, the user interface may be subjected to an authentication or authorization protocol for granting access of the interface to the user and for which, the present method is configured to determine the access level of the user in the enterprise and based on the determined access level, the identified relevant pieces of the content may be displayed. The term "access level" as used herein refers to the level of access provided to the each. In an example, the access level for an owner of the enterprise may be an unrestricted access or complete access i.e., able to freely modify the interface and the information displayed therein. In another example, the access level of an employee or a client may be either semi-restricted or completely restricted. It will be appreciated that the access level of the user may be changed based on the required implementation without any limitations.

The present disclosure also relates to a system for semantic search in an enterprise. Various embodiments and variants disclosed above, with respect to the aforementioned method as per the first aspect, apply mutatis mutandis to the present system.

The system comprises one or more data sources and at least one server communicably coupled to the one or more data sources. The term "server" as used herein refers to a structure and/or module that includes programmable and/or non-programmable components configured to store, process and/or share information or data for semantic search in an enterprise. Herein, the at least one server is configured to communicate with other elements within the system i.e., one or more data sources devices associated with the enterprise, to securely and efficiently performing semantic search in the enterprise. Alternatively stated, the at least one server is responsible for causing the searching operation (as per the aforementioned method) and configured to send commands, requests and messages to the connected elements i.e., the one or more data sources. Optionally, the server includes any arrangement of physical or virtual computational entities capable of enhancing information to perform various computational tasks. Furthermore, it will be appreciated that the at least one server may be implemented as a hardware server and/or plurality of hardware servers operating in a parallel or in a distributed architecture. Optionally, the servers in the at least one server is supplemented with additional computation system, such as neural networks, and hierarchical clusters of pseudo-analog variable state machines implementing artificial intelligence algorithms. In an example, the at least one server may include components such as a memory, a processor, a data communication interface, a network adapter and the like, to store, process and/or share information with other computing devices, such as the one or more data sources. Optionally, the at least one server is implemented as a computer program that provides various services (such as, database services) to other devices, modules or apparatuses. Moreover, the at least one server refers to a computational element that is operable to respond to and processes instructions to perform the semantic search in the enterprise. For example, the server may be a cloud server, an application server, a file server, a database server or a block chain server. Optionally, the server includes, but is not limited to, a microprocessor, a microcontroller, a complex instruction set computing (CISC) microprocessor, a reduced instruction set (RISC) microprocessor, a very long instruction word (VLIW) microprocessor, Field Programmable Gate Array (FPGA) or any other type of processing circuit, for example as aforementioned. Additionally, the at least one server is arranged in various architectures for responding to and processing the instructions for performing semantic search in the enterprise via the system.

Herein, the at least one server is configured to define entities in the enterprise, index content from the one or more data sources of the enterprise to determine relationships between individual pieces of the content and one or more of the entities, provide an interface to allow a user to enter a search query, parse the search query, determine relevant pieces of the content based on the parsed search query, identify the one or more of the entities for each of the relevant pieces of content based on the relationships therebetween and configure the interface to display each of the relevant pieces of the content under respective one or more of the entities in response to the search query.

In one or more embodiments, the at least one server is further configured to sort the relevant pieces of the content independently under each of respective one or more of the entities based on relevance of the corresponding relevant pieces of the content for the parsed search query and the one or more of the entities.

In one or more embodiments, the at least one server is further configured to determine access level of the user in the enterprise and configure the interface to display the identified relevant pieces of the content based on the determined access level of the user.

In one or more embodiments, the entities comprise one or more of project entity, people entity and repositories entity in the enterprise.

In one or more embodiments, the relevant pieces of the content comprises the relevant past projects related to the parsed search query, and wherein the interface is configured to display the relevant past projects under the project entity in response to the search query, the relevant pieces of the content comprises relevant profiles of people with skills related to the parsed search query, and wherein the interface is configured to display the relevant profiles of people under the people entity in response to the search query, and the relevant pieces of the content comprises at least one of relevant code repositories and relevant data repositories related to the parsed search query, and wherein the interface is configured to display the at least one of relevant code repositories and relevant data repositories under the repositories entity in response to the search query.

In one or more embodiments, the at least one server is further configured to extract text from the individual pieces of the content, group the extracted text into one or more groups, generate embeddings for each of the one or more groups and implement the generated embeddings for indexing of the content.

DETAILED DESCRIPTION OF THE DRAWINGS

Referring to FIG. 1, illustrated is a flowchart listing steps involved in a computer-implemented method 100 for semantic search in an enterprise, in accordance with an embodiment of the present disclosure. As shown, the method 100 comprises steps 102, 104, 106, 108, 110, 112 and 114. At a step 102, the method 100 comprises defining entities in the enterprise. Herein, the entities are defined into at least one of a people entity, a project entity and a repository entity. At a step 104, the method 100 further comprises indexing content from one or more data sources of the enterprise to determine relationships between individual pieces of the content and one or more of the entities. Herein, the content provided via the one or more sources is indexed to determine the relationships or connections existing between the individual pieces of the content and one or more of the defined entities for enabling accurate information retrieval. At a step 106, the method 100 further comprises providing an interface to allow a user to enter a search query. Herein, the user may enter the search query into the interface, for example, into an input module within the interface. At a step 108, the method 100 further comprises parsing the search query. That is, the search query is parsed to determine at least a context of the search query for determining accurate and/or relevant results. At a step 110, the method 100 further comprises determining relevant pieces of the content based on the parsed search query. The parsed search query is utilized to determine the relevant pieces of the content to be displayed as search results via the method. At a step 112, the method 100 further comprises identifying the one or more of the entities for each of the relevant pieces of content based on the relationships therebetween. Herein, the one or more of the defined entities are identified based on the relationships determined at the step 104 and are thereby linked with the relevant pieces of content for further display. And, at a step 114, the method 100 further comprises configuring the interface to display each of the relevant pieces of the content under respective one or more of the entities in response to the search query. Herein, the interface is configured to display each of the relevant pieces of the content under respective one or more of the entities in response to the search query. The aforementioned steps are only illustrative and other alternatives can also be provided where one or more steps are added, one or more steps are removed, or one or more steps are provided in a different sequence without departing from the scope of the present disclosure.

Figure 2:
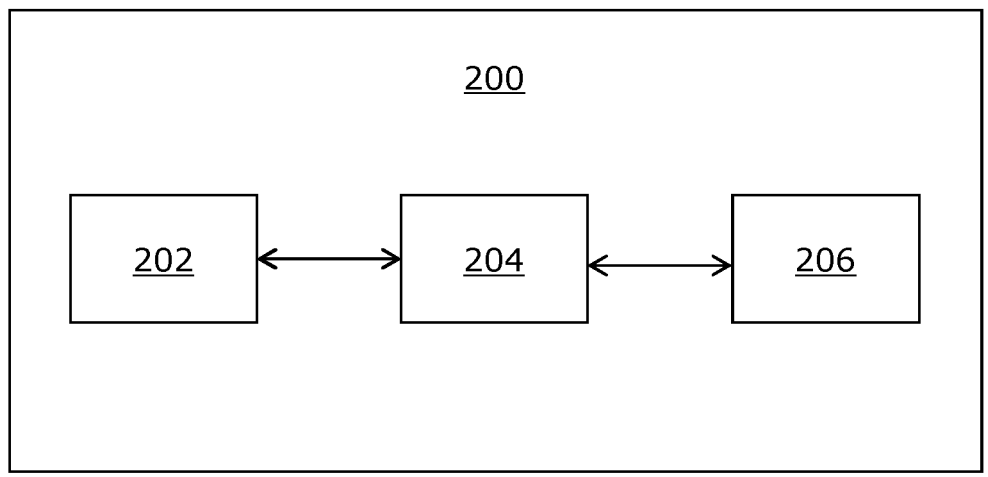
FIG. 2 illustrates a block diagram of a system for semantic search in an enterprise, in accordance with an embodiment of the present disclosure.

Referring to FIG. 2, illustrated is a block diagram of a system 200 for semantic search in an enterprise, in accordance with another embodiment of the present disclosure. As shown, the system 200 comprises one or more data sources 202 and at least one server 204 communicably coupled to the one or more data sources 202. Herein, the at least one server 204 is configured to define entities in the enterprise, index content from the one or more data sources 202 of the enterprise to determine relationships between individual pieces of the content and one or more of the entities, provide an interface 206 to allow a user to enter a search query, parse the search query, determine relevant pieces of the content based on the parsed search query, identify the one or more of the entities for each of the relevant pieces of content based on the relationships therebetween and configure the interface 206 to display each of the relevant pieces of the content under respective one or more of the entities in response to the search query.

Figure 3:
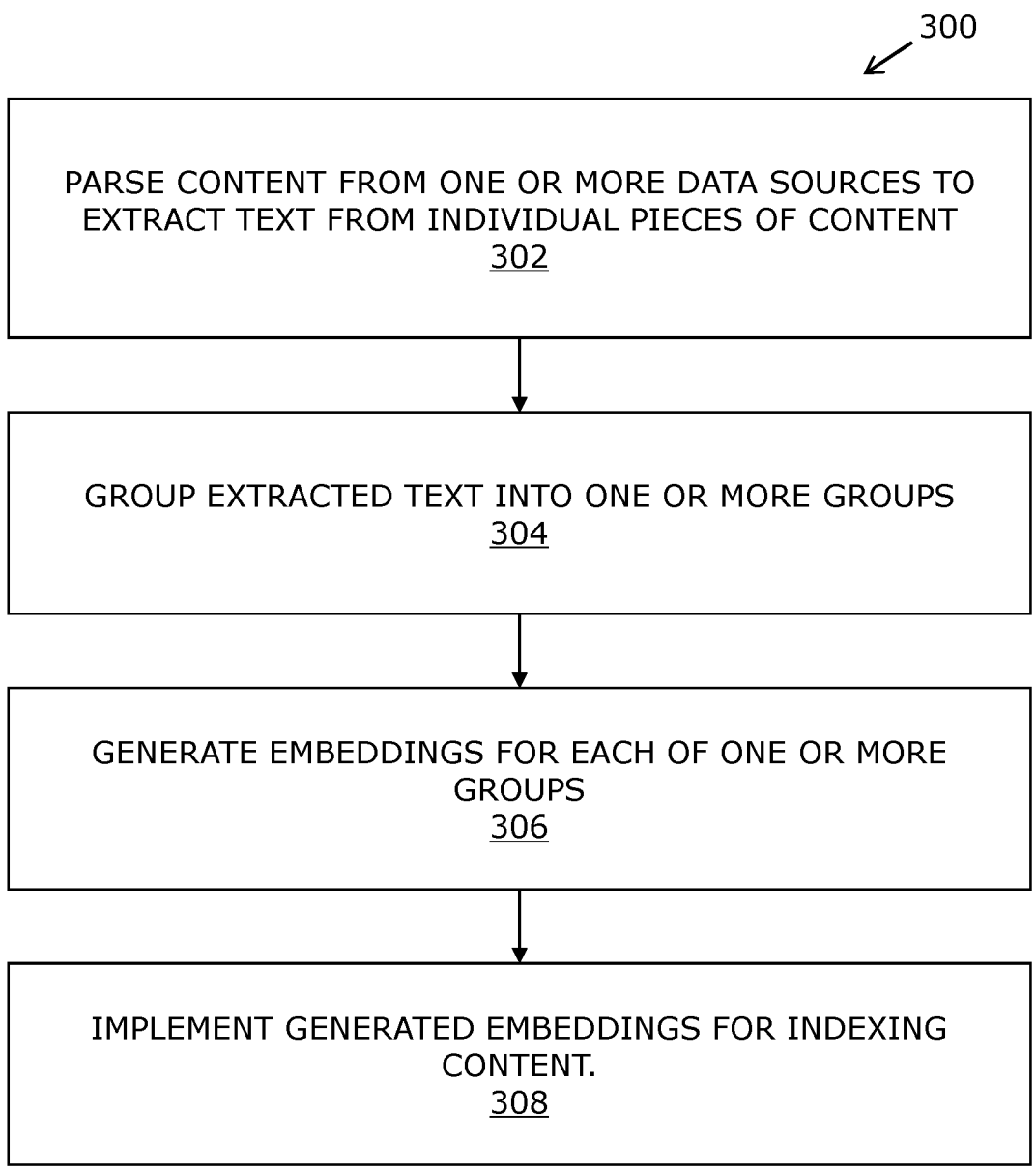
FIG. 3 is a flowchart listing steps involved in an indexing process for indexing the content from one or more data sources of the enterprise, in accordance with an embodiment of the present disclosure.

Referring to FIG. 3, illustrated is a flowchart listing steps involved in an indexing process 300 for indexing the content from one or more data sources (such as, the data sources 202) of the enterprise, in accordance with an embodiment of the present disclosure. As shown, the indexing process 300 comprises steps 302, 304, 306 and 308. At a step 302, the indexing process 300 comprises parsing the content from the one or more data sources to extract text from the individual pieces of the content. Herein, the indexing process 300 is configured to parse the content or extracting and analyzing the text of the content from the one or more data sources for a contextual understanding of the semantics thereof. At a step 304, the indexing process 300 further comprises grouping the extracted text into one or more groups. That is, the extracted text is then processed using a grouping process for enabling effective and accurate information retrieval in a single instance. At a step 306, the indexing process 300 further comprises generating embeddings for each of the one or more groups. The embeddings for each of the one or more groups are generated for enabling the indexing process for performing the indexing operation. And, at a step 308, the indexing process 300 comprises implementing the generated embeddings for indexing the content. That is, the generated embeddings are implemented for completing the indexing process 300. The aforementioned steps 302, 304, 306 and 308 are only illustrative and other alternatives can also be provided where one or more steps are added, one or more steps are removed, or one or more steps are provided in a different sequence without departing from the scope of the present disclosure.

Figure 4:
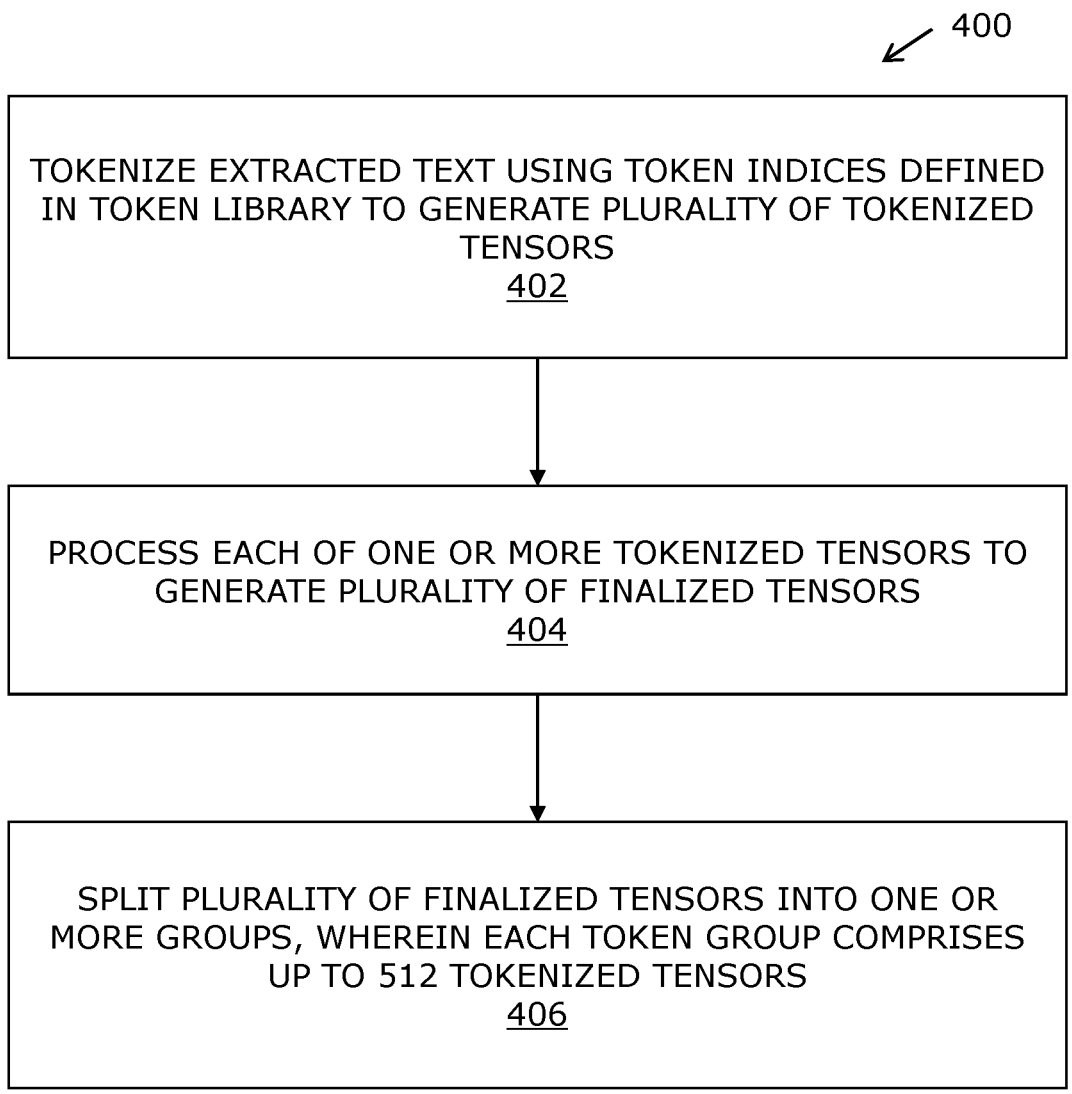
FIG. 4 is a flowchart listing steps involved in a grouping process for grouping text into one or more groups, in accordance with an embodiment of the present disclosure

Referring to FIG. 4, illustrated is a flowchart listing steps involved in a grouping process 400 for grouping text into one or more groups, in accordance with an embodiment of the present disclosure. As shown, the grouping process 400 comprises steps 402, 404 and 406. At a step 402, the grouping process 400 comprises tokenizing the extracted text using token indices defined in a token library to generate a plurality of tokenized tensors. Herein, the extracted text is tokenized using the token indices that are configured to be utilized for tokenizing the text as defined in the token library into the plurality of tokenized tensors. At a step 404, the grouping process 400 further comprises processing each of the one or more tokenized tensors to generate plurality of finalized tensors. Herein, for enabling the searching mechanism of the present method 100, the plurality of tokenized tensors are processed, for example, cleaned or padded, for uniformizing the plurality of tokenized tensors into the plurality of finalized tensors that are to be indexed. And, at a step 406, the grouping process 400 further comprises splitting the plurality of finalized tensors into one or more token groups, wherein each token group comprises up to 512 tokenized tensors. That is, the plurality of finalized tensors are then grouped or split uniformly or non-uniformly, based on the implementation, into the one or more groups. The aforementioned steps 402, 404 and 406 are only illustrative and other alternatives can also be provided where one or more steps are added, one or more steps are removed, or one or more steps are provided in a different sequence without departing from the scope of the present disclosure.

Figure 5:
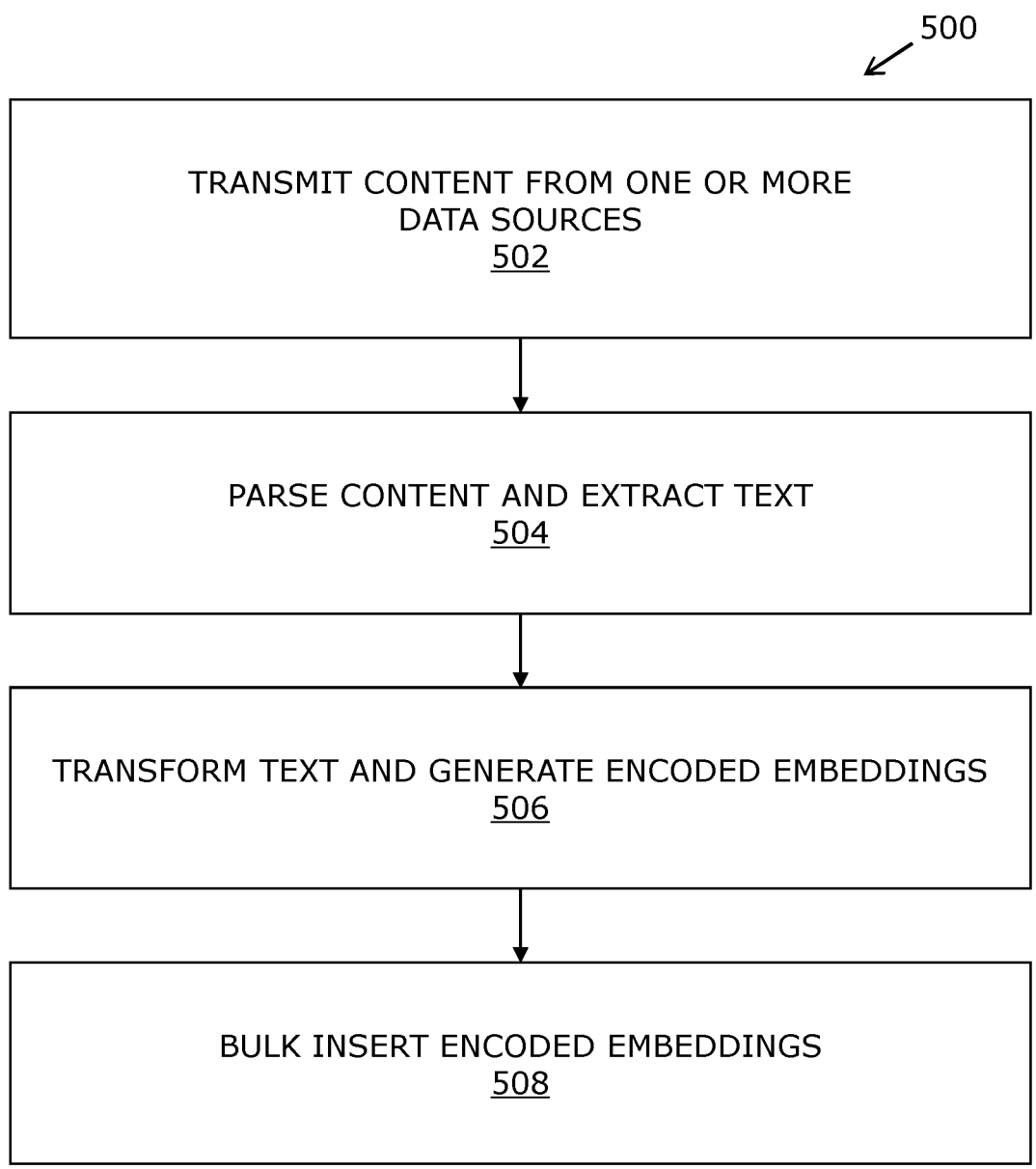
FIG. 5 is a simplified flow diagram of the method for semantic search in the enterprise, in accordance with an embodiment of the present disclosure.

Referring to FIG. 5, illustrated is a simplified flow diagram of the method 100 for semantic search in the enterprise, in accordance with an embodiment of the present disclosure. As shown, at a step 502, the heterogeneous data sources i.e., the one or more data sources 202 are configured to transmit content for further processing thereof via the method 100. Further, at a step 504, the content received from the one or more data sources 202 is parsed for extracting text therefrom. Furthermore, at a step 506, the extracted text is transformed into tokenized tensors for generating the encoded embeddings, wherein the encoded embeddings may be created using SBERT. Furthermore, at a step 508, the entire bulk of the encoded embeddings are thereby inserted into one or more data sources of the enterprise.

Figure 6:
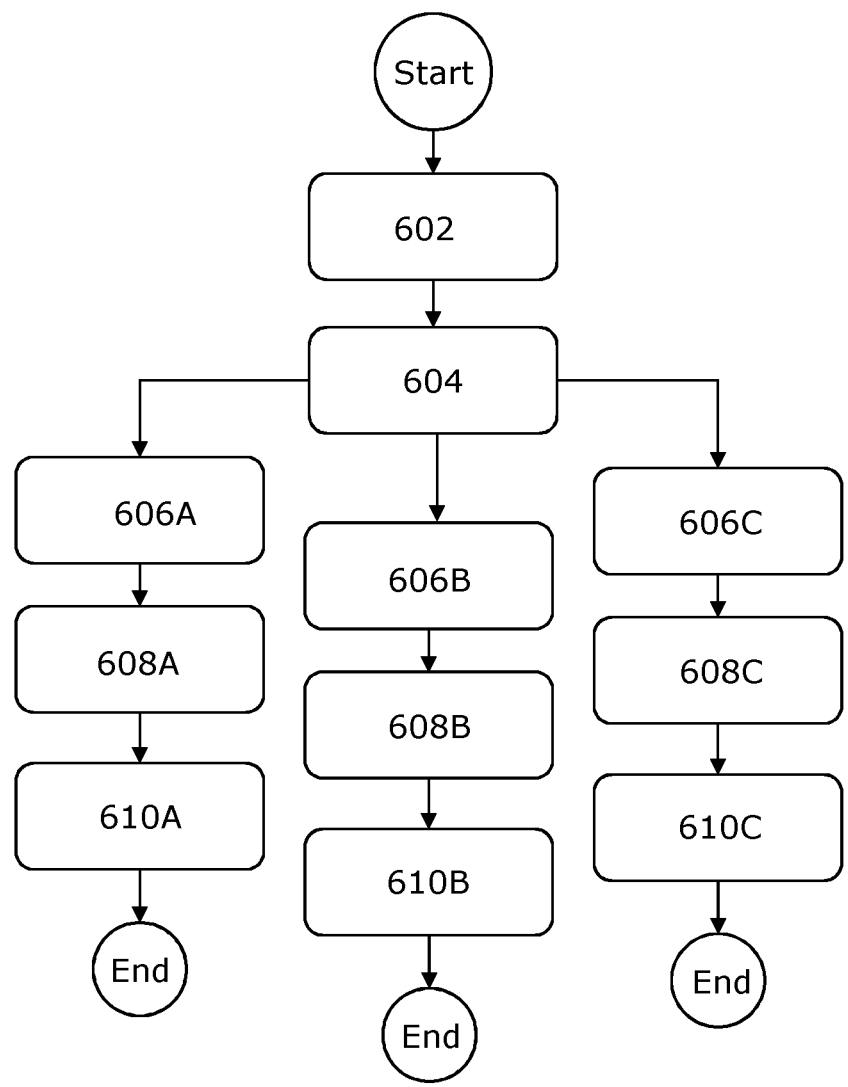
FIG. 6 is an exemplary flowchart listing steps involved for a user to implement the method of FIG. 1, in accordance with one or more embodiments of the present disclosure.

Referring to FIG. 6, illustrated is an exemplary flowchart listing steps involved for a user to implement the present method 100 of semantic search in the enterprise, in accordance with one or more embodiments of the present disclosure. As shown, the user is required to perform the illustrated steps 602, 604, 606A or 606B or 606C, 608A or 608B or 608C, and 610A or 610B or 610C. Typically, based on the type of information or entity being search for within the enterprise via the interface 206, the user is configured to perform steps 606A, 608A and 610A while searching for project entities and related content; steps 608B, 608B and 608B while searching for people entities; and steps 606C, 608C and 610C while searching for repository or database entities. Herein, at a step 602, the user enters a search query, via the interface 204, based on the required information from within the enterprise. At a step 604, the interface 204 is configured to display each of the relevant pieces of the content under respective one or more of the entities in response to the search query. At a step 606A or 606B or 606C, the user selects one of the defined entities via the interface 204 i.e., the user selects one of a people entity tab, or a project entity tab, or a data repository entity tab, based on the type of information required. At a step 608A or 608B or 608C, the interface 204 is configured to display each of the relevant pieces of the content under respective one or more of the entities (tab) in response to the search query. And, at a step 610A or 610B or 610C, the user retrieves or collects the information associated with the one of the defined entities i.e., collecting information or content associated with at least one of the people entity, the project entity, the data repository entity. The aforementioned steps 602, 604, 606A or 606B or 606C, 608A or 608B or 608C, and 610A or 610B or 610C are only illustrative and other alternatives can also be provided where one or more steps are added, one or more steps are removed, or one or more steps are provided in a different sequence without departing from the scope of the present disclosure.

Referring to FIGS. 7A to 7D, illustrated are diagrammatic representations of exemplary interfaces 700A to 700D utilized via the present method of semantic search in the enterprise, in accordance with one or more embodiments of the present disclosure. Herein, the exemplary interfaces 700A, 700B, 700C and 700D provide multiple input and output modules to be operated by the user for performing a required search, or locating and/or accessing any entity, or content thereof.

Figure 7A:
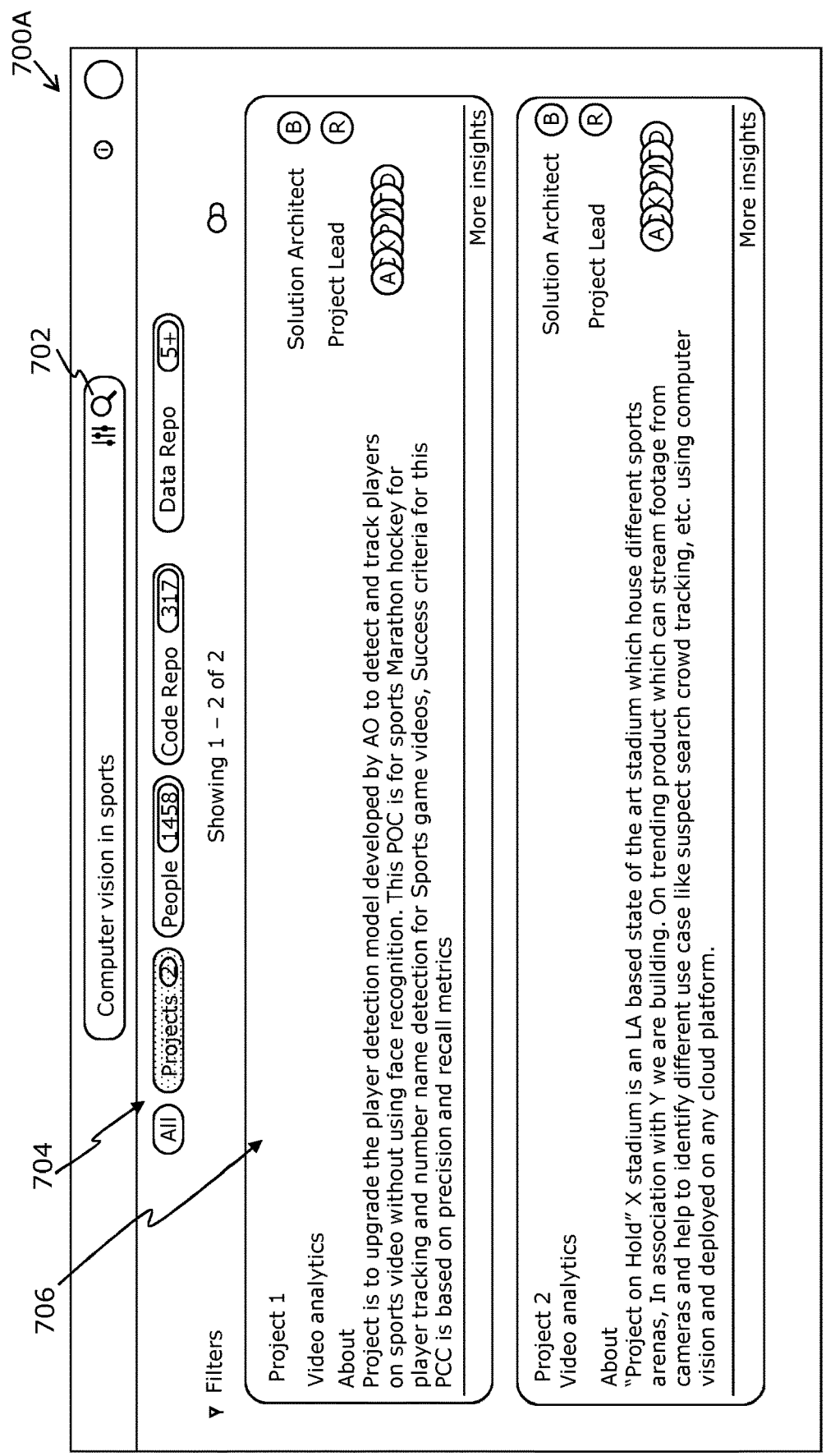
FIGS. 7A to 7D are diagrammatic representations of exemplary interfaces utilized in implementation of the method of FIG. 1, in accordance with one or more embodiments of the present disclosure.

Referring to FIG. 7A, illustrated is a first interface 700A utilized by the user, wherein the first interface 700A (corresponding to the interface 206 of FIG. 2) may be a primary interface (i.e., home interface). Herein, the user enters a search query in a first input module 702 and selects one of the defined entities via a second input module 704 to execute the method 100 of semantic search in the enterprise for searching a project entity therein. As shown, the entered search query is "Computer vision in sports" and correspondingly, upon being executed, the first interface 700A is configured to display each of the relevant pieces of the content under respective one or more of the entities 704 in response to the search query i.e., the project entities associated with the search query are displayed thereon via an output module configured to display the relevant project entities such as, 'Project 1' and 'Project 2' along with associated people entities.

Figure 7B:
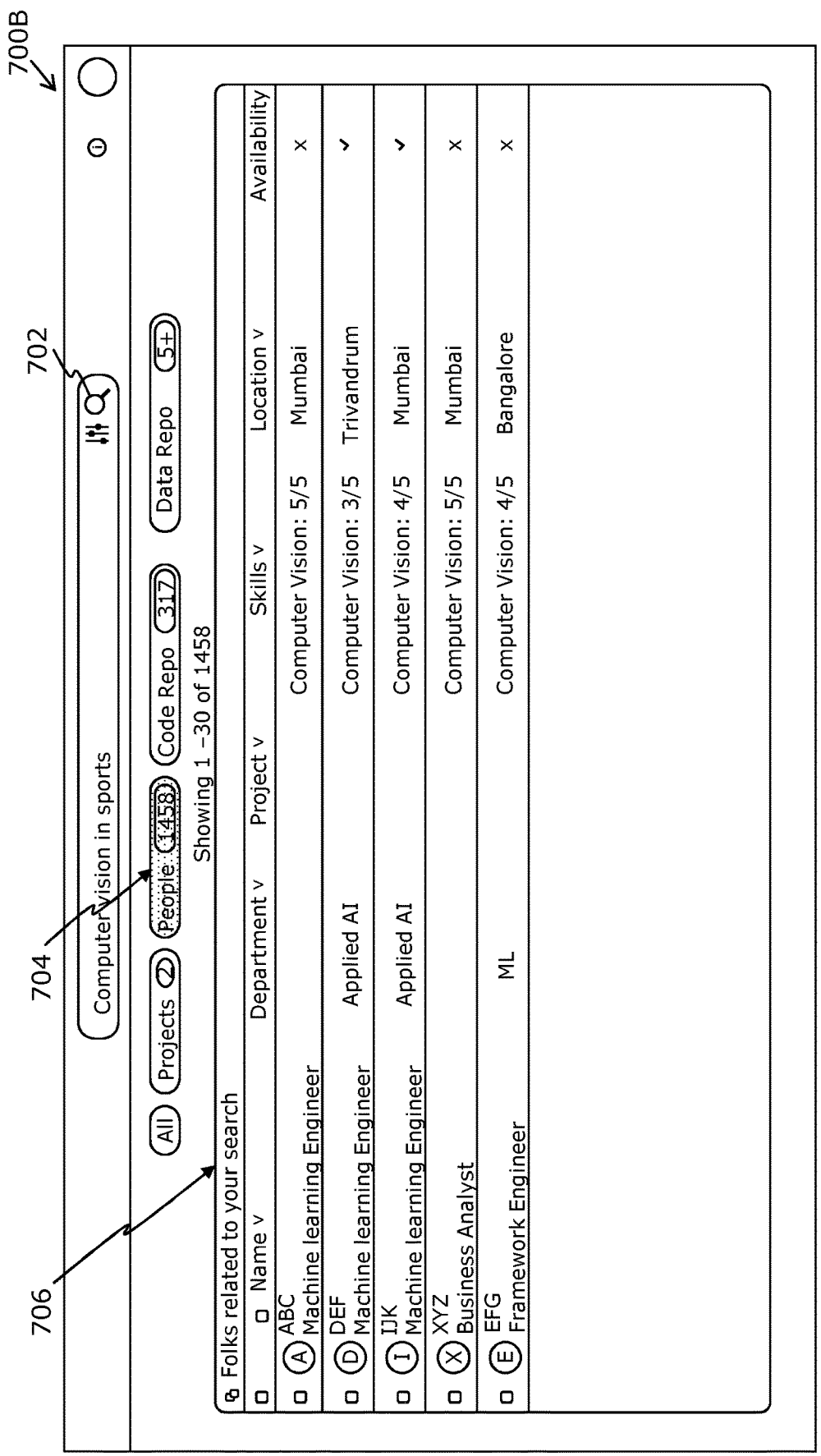

Referring to FIG. 7B, illustrated is a second interface 700B utilized by the user, wherein the second interface 700B (corresponding to the interface 206 of FIG. 2) may be a secondary interface. Herein, the user enters a search query in a first input module 702 and selects one of the defined entities via a second input module 704 to execute the method 100 of semantic search in the enterprise for searching a project entity therein. As shown, the entered search query is "Computer vision in sports" and correspondingly, upon being executed, the second interface 700B is configured to display each of the relevant pieces of the content under respective one or more of the entities 704 in response to the search query i.e., the people entities associated with the search query are displayed thereon via an output module 706 configured to display the relevant people entities, for example, 'ABC' and 'DEF' along with relevant pieces of the content, for example, department, skills, location, availability, and the like.

Figure 7C:
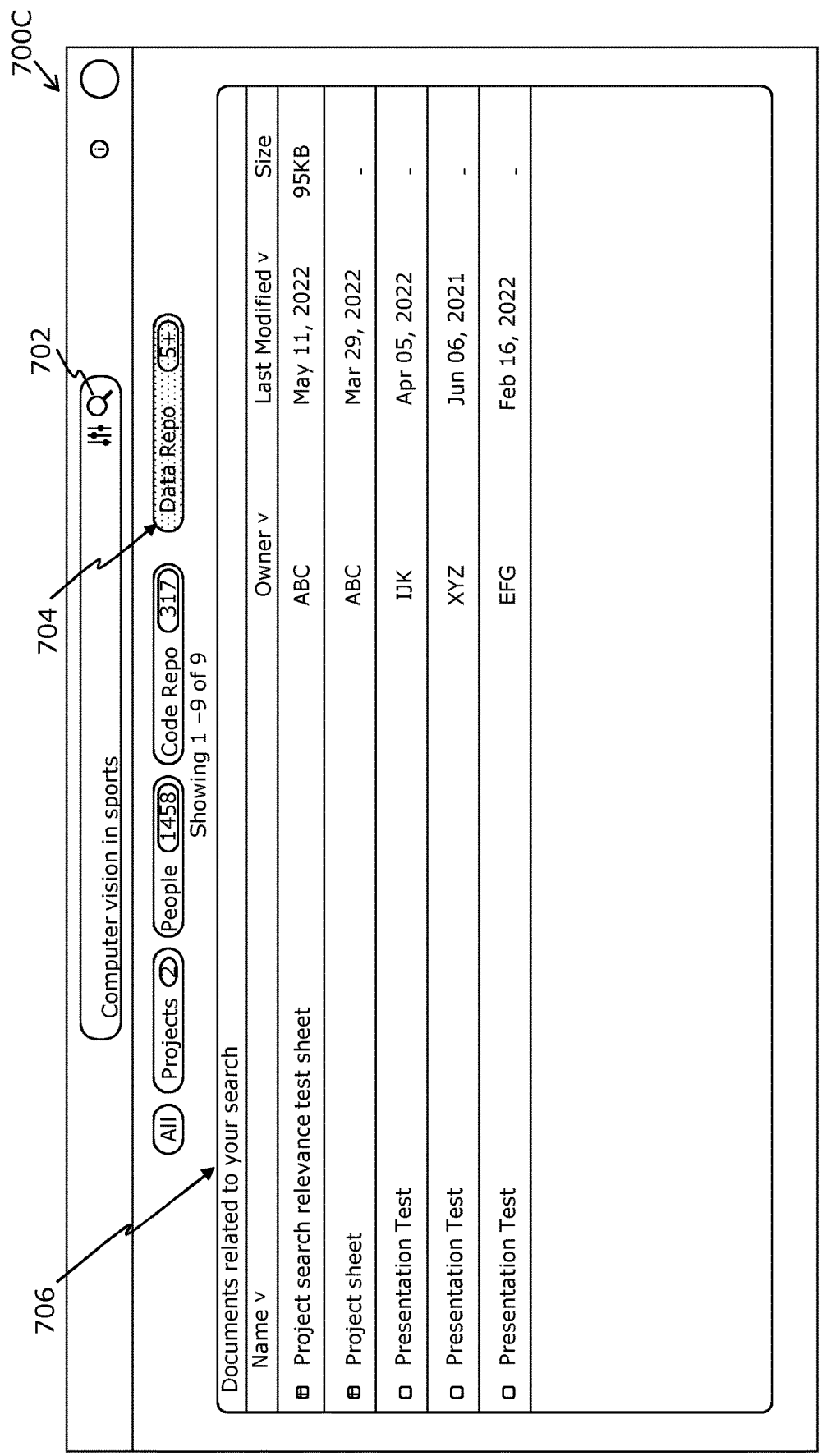

Referring to FIG. 7C, illustrated is a third interface 700C utilized by the user, wherein the third interface 700C (corresponding to the interface 206 of FIG. 2) may be a secondary interface. Herein, the user enters a search query in a first input module 702 and selects one of the defined entities via a second input module 704 to execute the method 100 of semantic search in the enterprise for searching a drive repository entity therein. As shown, the entered search query is "Computer vision in sports" and correspondingly, upon being executed, the third interface 700C is configured to display each of the relevant pieces of the content under respective one or more of the entities 704 in response to the search query i.e., the people entities associated with the search query are displayed thereon via an output module 706 configured to display the relevant repository entities, for example, 'Project sheet' and 'Presentation Test' along with relevant pieces of the content, for example, owner name, latest modification date, size, and the like.

Figure 7D:
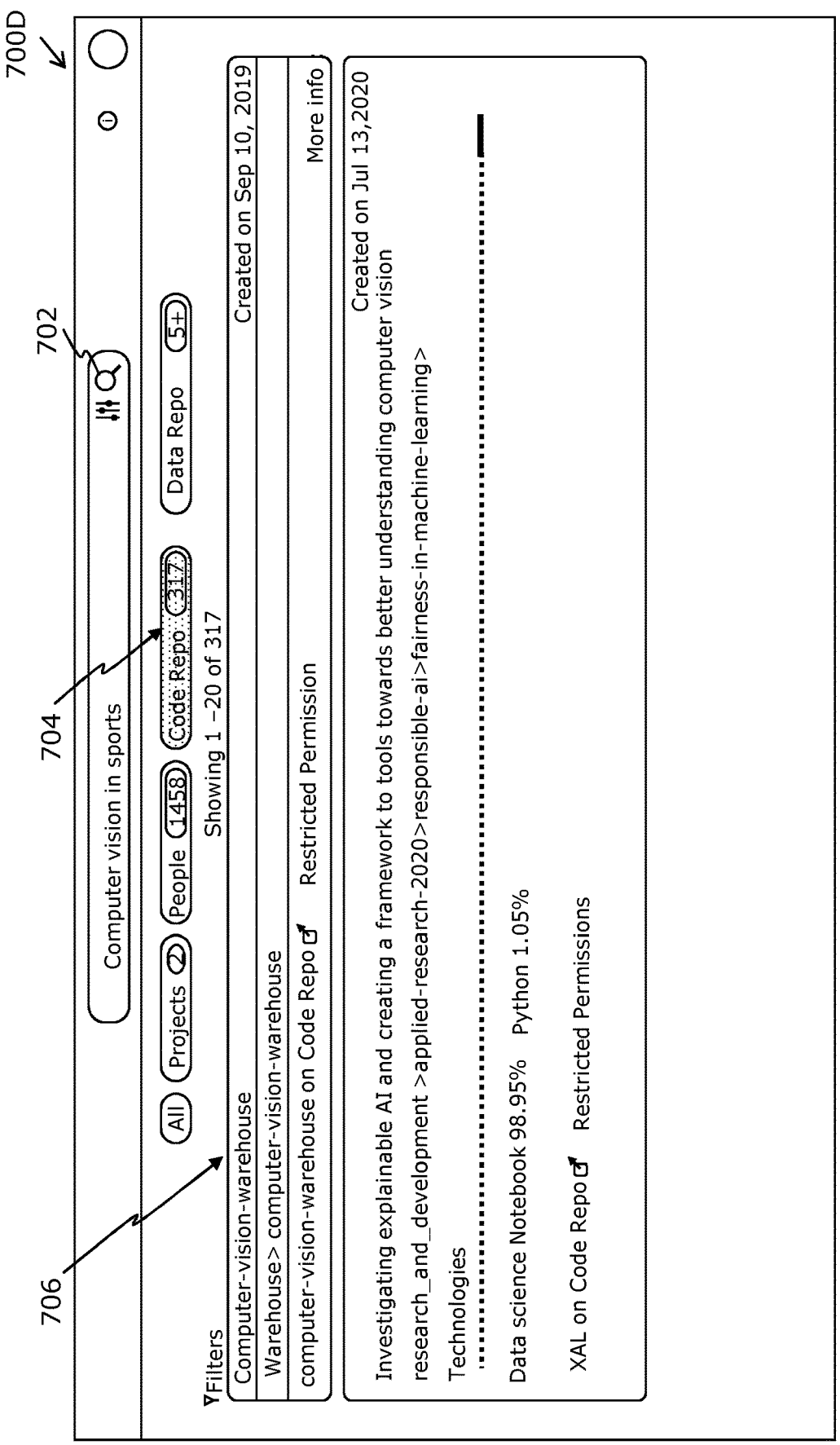

Referring to FIG. 7D, illustrated is a fourth interface 700D utilized by the user, wherein the fourth interface 700D (corresponding to the interface 206 of FIG. 2) may be a secondary interface. Herein, the user enters a search query in a first input module 702 and selects one of the defined entities via a second input module 704 to execute the method 100 of semantic search in the enterprise for searching a Code Repository entity therein. As shown, the entered search query is "Computer vision in sports" and correspondingly, upon being executed, the third interface 700C is configured to display each of the relevant pieces of the content under respective one or more of the entities 704 in response to the search query i.e., the data repository entities associated with the search query are displayed thereon via an output module 706 configured to display the relevant repository entities, for example, 'Computer-vision-warehouse' along with relevant pieces of the content, for example, access level, description, and the like.

Figure 8:
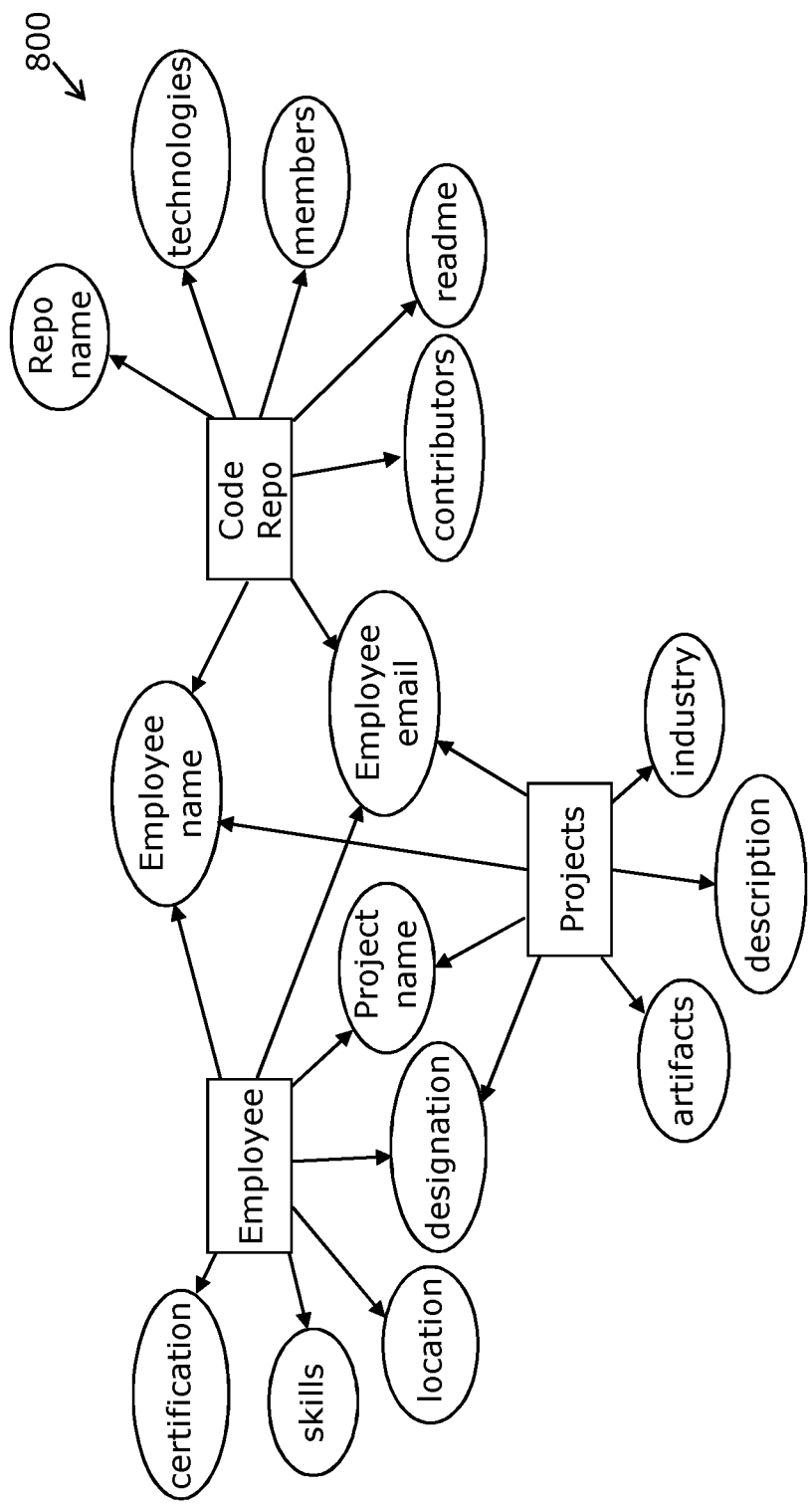
FIG. 8 is an exemplary ontology graph generated via determination of the relationships between one or more defined entities and individual pieces of the content, in accordance with one or more embodiments of the present disclosure.

Referring to FIG. 8, illustrated is an exemplary ontology graph 800 generated via determination of the relationships between one or more defined entities and individual pieces of the content. As shown, there are three different entities defined i.e., an employee (or person entity), Code Repository (or any code repository entity), and Projects (or project entity) and the determined relationships with one or more defined entities and individual pieces of the content, for example, employee entity is associated or in connection with certification, skills, location, designation, project name, employee email, that may further be associated with other defined entities to form the ontology graph 800.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer implemented method for semantic search in an enterprise, the method comprising:
defining entities in the enterprise;
determining relationships between individual pieces of content and one or more of the entities, wherein determining the relationships comprises boosting one or more of the entities based on a semantic metric, wherein the semantic metric is a quantitative measure of the determined relationships, and wherein the determined relationships enable provision of an interlinked search via the method where any search performed is based on the determined relationships between various data sources associated therewith;
providing an interface to allow a user to enter a search query;
parsing the search query;
determining relevant pieces of the content based on the parsed search query;
identifying the one or more of the entities for each of the relevant pieces of content based on the relationships therebetween; and
configuring the interface to display each of the relevant pieces of the content under respective one or more of the entities in response to the search query,
wherein the method further comprises determining access level of the user in the enterprise, and configuring the interface to display the identified relevant pieces of the content based on the determined access level of the user, wherein each of the user in the enterprise is provided with different level of access.

2. The method of claim 1, further comprising sorting the relevant pieces of the content independently under each of respective one or more of the entities based on relevance of the corresponding relevant pieces of the content for the parsed search query and the one or more of the entities.

3. The method of claim 1, wherein the entities comprise one or more of project entity, people entity and repositories entity in the enterprise.

4. The method of claim 3, wherein the relevant pieces of the content comprise relevant past projects related to the parsed search query, and wherein the interface is configured to display the relevant past projects under the project entity in response to the search query.

5. The method of claim 3, wherein the relevant pieces of the content comprise relevant profiles of people with skills related to the parsed search query, and wherein the interface is configured to display the relevant profiles of people under the people entity in response to the search query.

6. The method of claim 3, wherein the relevant pieces of the content comprise at least one of relevant code repositories and relevant data repositories related to the parsed search query, and wherein the interface is configured to display the at least one of relevant code repositories and relevant data repositories under the repositories entity in response to the search query.

7. A system for semantic search in an enterprise, the system comprising:
one or more data sources;
at least one server communicably coupled to the one or more data sources,
wherein the at least one server is configured to:

define entities in the enterprise;

determine relationships between individual pieces of content and one or more of the entities, wherein determining the relationships comprises boosting one or more of the entities based on a semantic metric, wherein the semantic metric is a quantitative measure of the determined relationships, and wherein the determined relationships enable provision of an interlinked search via the method where any search performed is based on the determined relationships between various data sources associated therewith;

provide an interface to allow a user to enter a search query;

parse the search query;

determine relevant pieces of the content based on the parsed search query;

identify the one or more of the entities for each of the relevant pieces of content based on the relationships therebetween; and configure the interface to display each of the relevant pieces of the content under respective one or more of the entities in response to the search query, wherein the at least one server is further configured to determine access level of the user in the enterprise, and configure the interface to display the identified relevant pieces of the content based on the determined access level of the user, wherein each of the user in the enterprise is provided with different levels of access.

8. The system of claim 7, wherein the at least one server is further configured to sort the relevant pieces of the content independently under each of respective one or more of the entities based on relevance of the corresponding relevant pieces of the content for the parsed search query and the one or more of the entities.

9. The system of claim 7, wherein the entities comprise one or more of project entity, people entity and repositories entity in the enterprise.

10. The system of claim 9, wherein the relevant pieces of the content comprise:

the relevant past projects related to the parsed search query, and wherein the interface is configured to display the relevant past projects under the project entity in response to the search query, the relevant pieces of the content comprise relevant profiles of people with skills related to the parsed search query, and wherein the interface is configured to display the relevant profiles of people under the people entity in response to the search query, and the relevant pieces of the content comprise at least one of relevant code repositories and relevant data repositories related to the parsed search query, and wherein the interface is configured to display the at least one of relevant code repositories and relevant data repositories under the repositories entity in response to the search query.

* * * * *